UNITED STATES PATENT OFFICE.

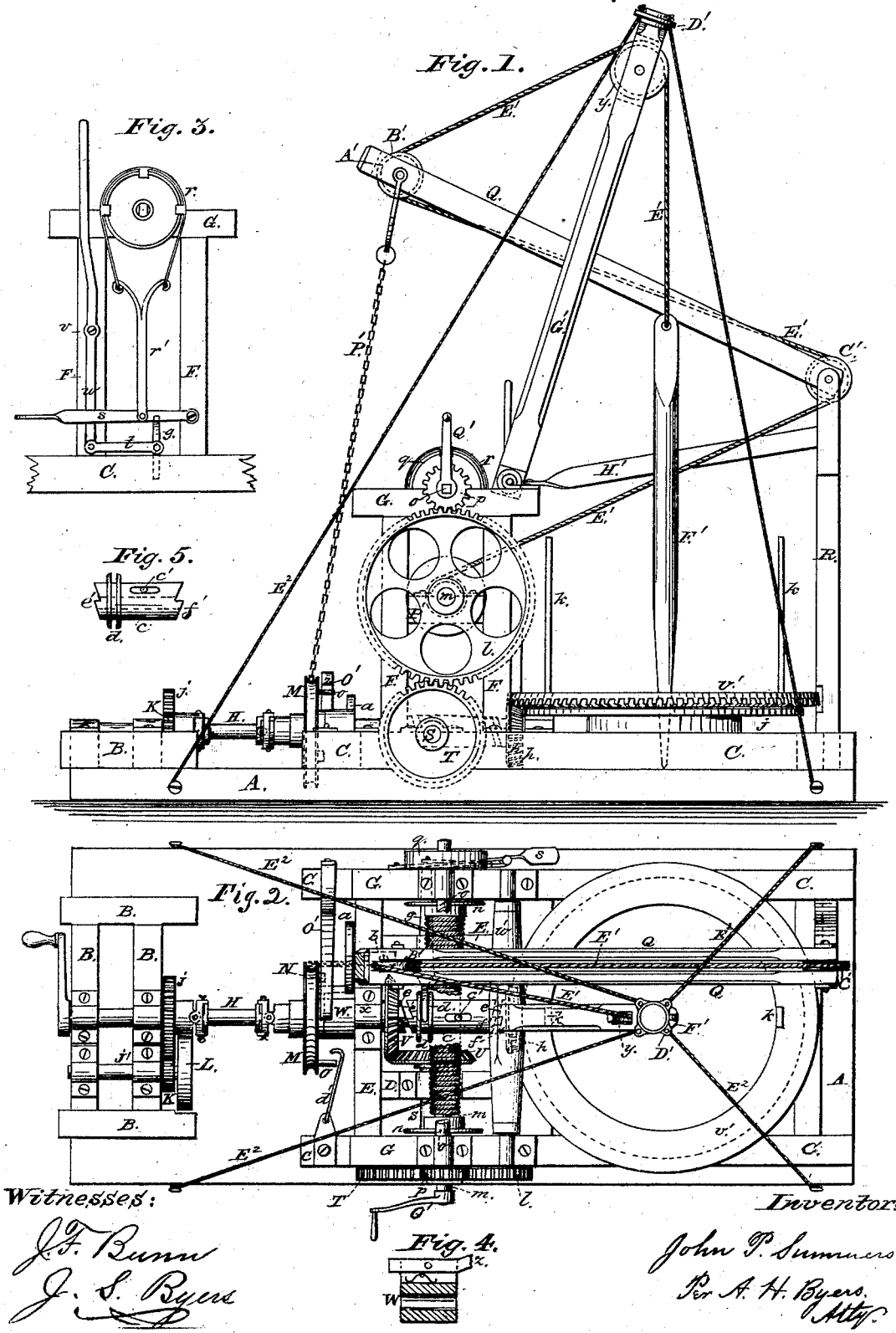

JOHN P. SUMMERS, OF TIFFIN, OHIO.

IMPROVEMENT IN WELL-BORING AND ROCK-DRILLING MACHINES.

Specification forming part of Letters Patent No. 202,677, dated April 23, 1878; application filed September 19, 1877.

*To all whom it may concern:*

Be it known that I, JOHN P. SUMMERS, of the city of Tiffin, in the county of Seneca and State of Ohio, have invented new and useful Improvements in Well-Boring and Rock-Drilling Machines, which improvements are fully set forth in the following specification, reference being had to the accompanying drawings.

Figure 1 is a side view of my machine. Fig. 2 is a plan view of my machine. Fig. 3 is a side view, showing the brake $r$, lever $w$, and contiguous parts. Fig. 4 is a sectional view of the collar W. Fig. 5 is a sectional view of the collar $c$.

The letter A represents the heavy or principal frame. B represents a small frame, mounted upon and firmly secured to the front end of frame A. C represents a frame, mounted upon and firmly secured to frame A in rear of frame B. D and E are cross-pieces, running lengthwise with the large frame and between the front cross-pieces of frame C. H represents the main or drive shaft, and is mounted upon frames B and C. J represents a cog-wheel, mounted upon shaft H. The cogs of this wheel mesh in the cogs of wheel K on shaft J'. Just in rear of this wheel, and mounted upon the same shaft, is the balance-wheel L.

On shaft H, between frames B and C, is placed the wheel or pulley M, which may have either a plain or grooved surface, and is loose on shaft H. Just in rear of wheel M, and on the same shaft, is firmly secured a sleeve or collar, W. This collar has a lug or projection on one side, as shown in Fig. 4, but may be made round or in any other shape desired, and has a slot in said lug, or in one side of the collar, in which is pivoted a trip-finger, $z$, both ends of which extend beyond the ends of the collar W or lug $x$. Under one end of this trip-finger is placed a spring, which holds it in a certain position when at rest.

Wheel M has a pin, N, near the edge or rim, which is grasped by a spring-catch, O'. A pin or key, O, passes through wheel M in such a position that when the collar W revolves the trip-finger $z$ catches it and causes the wheel M to revolve. On the front cross-piece of frame C is mounted the trip-wheel $a$.

I prefer to use a wheel for the purpose of saving friction; but any other suitable device can be substituted for this wheel.

Just in rear of the front cross-bar of frame C is placed the bevel-wheel V, which is loose on shaft H, and has clutches $e$ on the rear side. The cogs of wheel V mesh in the cogs of wheel U, which has its bearings on shaft S. On the outer end of this shaft is mounted the wheel T. The bevel-wheel $h$ plays on the rear end of shaft H, and has clutches $f$ on its front side.

On the main shaft H, between wheels V and $h$, is placed the collar $c$, which is loose and will play easily in any direction. This collar has longitudinal slots on opposite sides, and a pin, $c'$, passing through shaft H and into these slots, gives the collar longitudinal play and rotary motion when the shaft is turned. This collar has clutches $e'$ on the front end and $f'$ on the rear end, fitting those on wheels V and $h$, and a grooved flange, $d$, as shown in Fig. 4.

The inner or forked end of the lever $g$, which is pivoted on the cross-piece E, fits snugly in this groove, and is used to change the position of collar $c$ and hold it in any desired place on shaft H. The other end of this lever is pivoted to one end of arm $t$, the other end of which is pivoted to the lever $w$, which is in turn pivoted to post F, as shown in Fig. 2, thus forming a continuous lever for operating or controlling collar $c$.

A hook, $d'$, is made of the proper length to grasp pin N and hold wheel M in such a position as to allow the trip-finger $z$ to be raised up by wheel $a$ at the proper time to pass over the lug or key O. The same thing may be accomplished by a chain or hook attached to the walking-beam Q.

A circular rim, $j$, is firmly secured to the rear end of frame C, with a flange extending upward. The large bevel-wheel $v'$ is mounted upon this rim, and also has a flange on its under side, fitting snugly inside of the flange on rim $j$, holding it in position when in operation. To this wheel are firmly secured two uprights, $k\ k$, as shown in Fig. 1. The cogs of wheel $v'$ mesh in the cogs of wheel $h$.

Near the front end of frame C are four posts, F. On the top of these posts are plates or timbers G G. Posts F also have cross-beams P P, upon which the shaft $m$ has its bearings, and just inside of its bearings are attached flanges $n$ $n$, forming, with the shaft, a reel or spool. Wheel $l$ is attached to one end of this shaft, as shown in Fig. 1, the cogs of which mesh in the cogs of wheel T. Shaft $o$ is mounted upon plates G G. On one end of shaft $o$ is placed the wheel $p$, the cogs of which mesh in the cogs of wheel $l$. On the other end of shaft $o$ is mounted the wheel $q$. A crank, Q', is placed outside of wheel $p$ on shaft $o$, but may be placed on either end of said shaft. A band, $r$, passes over wheel $q$, the ends of which are hooked on or secured to the forked arm $r'$, the other end of which is pivoted to the lever $s$, thus forming a brake.

At the rear end of frame C is firmly secured, by bolts or screws, a post, R. A brace, H', extends from this post to plate G, to strengthen and keep it firm. In the top of this post is pivoted one end of the walking-beam, Q, the other end being left free. This beam has pulleys A' and C' in its ends. It is made of two boards or planks, fastened together at the ends, leaving space between them, so as to allow a cord or chain to pass between the parts. A loop or clevis is attached to the loose end of this beam, to which the chain, rope, or band P' is attached. The other end of this chain is attached to wheel M. Mounted upon the rear end of plates G G there is pivoted a cross-piece, $w'$, to which is attached a derrick-pole, G', provided at its upper end with a pulley, $y$. One end of the rope $E^1$ is attached to and wound round the reel formed by the shaft $m$ and flanges $n$ $n$. The other end is then passed backward and upward around pulley C', forward through the open space in beam Q, upward and around pulley A'; thence backward and over pulley $y$ in top of the gin-pole; thence downward, and is attached to the drill F' by a swivel or any other device. The letter $E^2$ represents the guy-ropes used to keep the gin-pole in position.

The operation of my machine is as follows: For drilling in the rock, I use a drop rock-drill of any kind, and drill shaft or shafts connected thereto. The large wheel $v'$ can be removed and the drill turned by hand; or it can be left on, and be used to automatically turn the drill-shaft. The rope, in drilling, passes from the spool on shaft $m$ under the walking-beam Q, under and over the pulley C', under and over the pulley A'; thence up and over the pulley $y$ at the top of the gin-pole, and is connected to the drill-shaft by a swivel or any other device. Motive power being now applied to shaft H, the collar W will revolve with it, and the trip-finger $z$ catch the lug O and carry wheel M round, winding up the chain P', and thus draw down the walking-beam Q and raise the drill F' by means of the rope $E^1$. When the wheel M is turned far enough to draw up the drill a sufficient height, the other end of the trip-finger $z$ is pressed down by the wheel $a$, so that the lug O will slip past it and release the wheel M. The weight of the drill will now reverse the motion of wheel M until it is caught and held in position by the spring-catch $g$ grappling the pin N. To counteract the loss of weight caused by the drop of the drill, and to avoid a jerk on the power, I use the gearing J and K and the balance-wheel L, which gives a regular motion to the shaft H.

When the drill passes down into the rock and causes the rope $E^1$ to tighten, I feed out the same by slightly turning the crank Q' on shaft $o$, and regulate the rise or drop of the drill in the same way by tightening or loosening the rope on shaft $m$. When I wish to raise the drill out of the hole, I push the lever $w$ to a proper position, so that clutches $e'$ on collar $c$ will engage with those on wheel $v$, which will cause the wheel V to revolve and put in motion the gearing U, T, and $l$, which will wind the rope $E^1$ on shaft $m$, and thus raise the drill, the walking-beam being held down by first winding the chain P on wheel M, and securing it in that position by means of hook $d'$. This also causes the trip-finger $z$ to rise, as hereinbefore described, and pass over the pin O in wheel M at the right point, so that said wheel will not turn.

When I desire to use my machine for boring wells or holes in the earth, I use an earth-auger of any kind, and a shaft with a cross-arm sliding thereon in place of the drill-shaft F', as shown in Fig. 1. I also remove or disconnect the post R, the walking-beam Q, the wheel M, and the balance-wheel L. The rope $E^1$ is then passed directly from shaft $m$ up and over the pulley $y$ in the top of the gin-pole G', and is connected to the auger-shaft by means of a swivel or other device. The auger is passed down through the wheel $v'$, the lever $w$ placed in position to connect the clutches $f'$ on the collar $c$ with the clutches $f$ on wheel $h$, when all is ready to apply the motive power to shaft H. This will put in motion the large wheel $v'$. The uprights $k$ $k$ will catch the ends of the cross-arm on the auger-shaft, and cause the auger to bore.

When the auger is full I push the lever $w$ to another position, so as to cause the clutches $e'$ on the collar $c$ to engage with the clutches $e$ on wheel V. Wheel V, being thus set in motion, imparts the same to the gearing and raises the auger, as above described in raising the drill.

In case of accident, or wishing to check the motion of my machine for any other reason, or in case of lowering the auger and wishing to stop it quickly, I have a foot-lever, $s$, and brake $r$ on wheel $q$, as shown in Fig. 2, which will accomplish this purpose.

In case the auger needs raising while revolving, I use a crank, Q', on either end of shaft $o$.

I claim as my invention—

1. The combination of the large bevel-wheel $v'$, bevel-wheel $h$, and clutches $f'$ on collar $c$, when the same are constructed, arranged, and operated by the means and in the manner herein described.

2. The combination of the hoisting-gear U, T, and l with bevel-wheel V and clutches e', secured to the collar c, in the manner and for the purpose herein described.

3. The combination of the drive-wheel v' with the hoisting-gear U, T, and l, pinions h and V on shaft H, controlled by the clutches e' and f', secured on collar c, and lever g, in the manner and for the purpose herein described.

4. The grooved or plane-faced loose wheel M, with the pin N and steel key O secured to the same, said wheel being upon the driving-shaft H, combined with the spring-catch O' and trip-finger z, in the manner and for the purpose herein described.

5. The combination of the collar W, with the shaft H, wheel M, with its catch-spring O' and pin N, chain P', and drill F', in the manner and for the purpose herein described.

6. The combination of the wheel M, pins N and O, spring O', collar W, with trip-finger z, and chain P', substantially as set forth and described.

7. The combination of the wheel a with trip-finger z and wheel M, chain P', and drill F', in the manner and for the purpose herein described.

8. The combination of the wheel M, with its pins N and O, with chain P', walking-beam Q, post R, pulleys y A' C', and rope E¹, in the manner and for the purpose herein described.

9. The wheel M and pins N and O, in combination with wheel a, chain P', walking-beam Q, post R, gin-pole G', rope E¹, and drill F', all constructed and arranged as and for the purpose set forth.

10. The wheel M and pins N, in combination with pinions J and K and the balance-wheel L, arranged substantially as and for the purpose set forth.

11. The wheel M, with pins N and O, in combination with chain P', walking-beam Q, post R, gin-pole G', pulleys A', y, and C', rope E¹, pinions J and K, and the balance-wheel L, substantially as and for the purpose described.

12. The brake r, in combination with the hoisting-gear U, T, l, and o, substantially as and for the purpose set forth.

13. The wheel M, with pins N and O, in combination with hook d', collar W, trip-finger z, wheel a, and the hoisting-gear U, T, and l, substantially as and for the purpose set forth.

JOHN P. SUMMERS.

Witnesses:
  J. F. BUNN,
  J. S. BYERS.